(12) United States Patent
Arvin et al.

(10) Patent No.: US 11,235,404 B2
(45) Date of Patent: Feb. 1, 2022

(54) PERSONALIZED COPPER BLOCK FOR SELECTIVE SOLDER REMOVAL

(71) Applicant: INTERNATIONAL BUSINESS MACHINES CORPORATION, Armonk, NY (US)

(72) Inventors: Charles L. Arvin, Poughkeepsie, NY (US); Luca Del Carro, Adliswil (CH); Thomas Brunschwiler, Thalwil (CH); Thomas Weiss, Poughkeepsie, NY (US); Chris Muzzy, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/826,226

(22) Filed: Mar. 21, 2020

(65) Prior Publication Data

US 2021/0291287 A1    Sep. 23, 2021

(51) Int. Cl.
| | |
|---|---|
| *B23K 1/00* | (2006.01) |
| *B23K 1/018* | (2006.01) |
| *B22F 3/11* | (2006.01) |
| *B23K 3/08* | (2006.01) |
| *B23K 101/40* | (2006.01) |

(52) U.S. Cl.
CPC ............... *B23K 1/018* (2013.01); *B22F 3/11* (2013.01); *B23K 3/08* (2013.01); *B23K 2101/40* (2018.08)

(58) Field of Classification Search
CPC ............ B23K 1/018; B23K 3/08; B23K 2101/36–42; B23K 1/00–206; B22F 3/11
USPC ............ 228/119, 191, 264, 248.1–248.5, 228/179.1–180.22
See application file for complete search history.

(56) References Cited

U.S. PATENT DOCUMENTS

| | | | |
|---|---|---|---|
| 4,746,050 A | 5/1988 | Brown | |
| 5,065,931 A | 11/1991 | Liu et al. | |
| 5,219,520 A * | 6/1993 | Brofman | B22F 3/11 228/19 |
| 5,284,286 A * | 2/1994 | Brofman | B22F 3/11 228/119 |
| 5,440,239 A | 8/1995 | Zappella et al. | |
| 5,458,281 A * | 10/1995 | Downing | B23K 1/018 228/264 |
| 5,790,377 A | 8/1998 | Schreiber et al. | |
| 5,909,838 A | 6/1999 | Jimarez et al. | |
| 6,227,434 B1 | 5/2001 | Bassi et al. | |
| 9,674,952 B1 * | 6/2017 | Liu | H05K 3/4007 |

(Continued)

FOREIGN PATENT DOCUMENTS

JP    2014232801 A    12/2014

OTHER PUBLICATIONS

B. Le Pape "Use of a Tinned Copper Slug for Module Reworking," Original Publication Date: Dec. 1, 1981, Original Disclosure Information: TDB 12-81 p. 3481, IP.com No. IPCOM000048190D, IP.com, Feb. 8, 2005.

(Continued)

*Primary Examiner* — Kiley S Stoner
(74) *Attorney, Agent, or Firm* — L. Jeffrey Kelly (57) ABSTRACT

Disclosed are embodiments of forming porous copper on the end of a copper pillar. The embodiments may be used to remove solder from selected locations on a chip or laminate substrate.

14 Claims, 9 Drawing Sheets

(56) References Cited

U.S. PATENT DOCUMENTS

| | | | | |
|---|---|---|---|---|
| 2002/0102432 | A1* | 8/2002 | Ochiai | B23K 35/025 |
| | | | | 428/671 |
| 2008/0206960 | A1* | 8/2008 | Dang | H01L 25/0657 |
| | | | | 438/459 |
| 2011/0003470 | A1* | 1/2011 | Burgess | H01L 24/11 |
| | | | | 438/614 |
| 2011/0298123 | A1* | 12/2011 | Hwang | H01L 24/11 |
| | | | | 257/737 |
| 2012/0266459 | A1* | 10/2012 | Bessette | B23K 1/018 |
| | | | | 29/825 |
| 2013/0258595 | A1* | 10/2013 | Tuckerman | H01L 23/445 |
| | | | | 361/701 |
| 2014/0151874 | A1* | 6/2014 | Obu | H03F 3/195 |
| | | | | 257/737 |
| 2017/0200659 | A1* | 7/2017 | Gaynes | H01L 24/32 |
| 2017/0317036 | A1* | 11/2017 | Myers | H01L 23/562 |
| 2017/0330870 | A1* | 11/2017 | Chen | H01L 24/20 |
| 2018/0190577 | A1* | 7/2018 | Gupta | H01L 23/3107 |
| 2018/0259268 | A1* | 9/2018 | Zhou | H01L 23/427 |
| 2019/0109084 | A1* | 4/2019 | Brunschwiler | H01L 23/49811 |
| 2019/0341374 | A1* | 11/2019 | Shaw | H01L 24/20 |
| 2020/0251350 | A1* | 8/2020 | Gutierrez, III | H01L 23/5389 |
| 2020/0312737 | A1* | 10/2020 | Stahr | H01L 23/3677 |
| 2020/0344893 | A1* | 10/2020 | Nakako | H01B 1/22 |
| 2021/0082853 | A1* | 3/2021 | Lin | H01L 24/11 |
| 2021/0242166 | A1* | 8/2021 | Huang | H01L 24/32 |

OTHER PUBLICATIONS

T. C. Reiley, "Chip Rework on Multilayer Ceramic Recess," Original Publication Date: Mar. 1, 1985, Original Disclosure Information: TDB 03-85 p. 6344-6345, IP.com No. IPCOM000063646D, IP.com, Feb. 18, 2005.

\* cited by examiner

PERSONALIZED COPPER BLOCK FOR SELECTIVE SOLDER REMOVAL

BACKGROUND

The present exemplary embodiments pertain to methods and structures for selectively removing solder from a substrate or component including a semiconductor chip or a laminate substrate.

Removal of solder from a substrate or component is a necessary process that is widely practiced for the repair or rework of electronic assemblies. Electronic components may be joined to a supporting substrate with solder balls. When a component or a semiconductor chip is removed from a substrate due to some known or suspected defect in the component or attachment, a quantity of solder of random or irregular shape often having a rough surface is left behind on the substrate component attachment pads. Such surfaces are unsuitable for attaching another component or re-attaching the same component without first removing the quantity of solder to provide a uniform surface on the attachment pads. Components including semiconductor chips and laminate substrates may also have a quantity of solder which needs to be removed prior to use or re-use.

BRIEF SUMMARY

The various advantages and purposes of the exemplary embodiments as described above and hereafter are achieved by providing, according to an aspect of the exemplary embodiments, a method of forming a copper block for selective solder removal comprising the steps of: joining a copper pillar to a first substrate; creating a cavity in a second substrate; adding a predetermined quantity of copper-containing paste into the cavity; pressing an end of the copper pillar into the copper-containing paste in the cavity; and heating the copper pillar with the copper-containing paste in the cavity to a predetermined temperature to form a copper pillar having a predetermined volume of porous copper on the end of the copper pillar.

According to another aspect of the exemplary embodiments, there is provided a method of selective solder removal comprising the steps of: joining a copper pillar to a first substrate; creating a cavity in a second substrate; adding a predetermined quantity of copper-containing paste into the cavity; pressing an end of the copper pillar into the copper-containing paste in the cavity; heating the copper pillar with the copper-containing paste in the cavity to a predetermined temperature to form a copper pillar having a predetermined volume of porous copper on the end of the copper pillar; applying the porous copper to a solder connection to be removed from a third substrate; and heating the porous copper and solder connection so as to cause melting of the solder connection and absorbing of the melted solder into the porous copper.

According to a further aspect of the exemplary embodiments, there is provided a method of forming a copper block for selective solder removal comprising the steps of: providing a semiconductor chip having a plurality of copper pillars, with a first subset of the plurality of copper pillars having porous copper on the end of the subset of the plurality of copper pillars and a second subset of the plurality of copper pillars devoid of the porous copper on the end of the second subset of the plurality of copper pillars; pressing an end of each of the first subset and second subset of the plurality of copper pillars into a copper-containing paste; withdrawing the end of each of the first subset and second subset of the plurality of copper pillars from the copper-containing paste, each of the copper pillars having a quantity of copper-containing paste adhered to the end of each of the copper pillars; and applying a laser to the copper-containing paste of the second subset of the plurality of copper pillars and heating the copper-containing paste of the second subset of the plurality of copper pillars to a predetermined temperature and for a predetermined time to sinter and transform the copper-containing paste into a porous copper on the end of each of the copper pillars in the second subset of the plurality of copper pillars.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIGS. 1 to 4 illustrate an exemplary embodiment of forming porous copper on the end of a copper pillar in which:

FIGS. 6 to 10 illustrate an exemplary embodiment in which a chip may have a partially or fully missing solder ball in which:

FIGS. 11 to 16 illustrate an exemplary embodiment of a chip having copper pillars and porous copper on the tips of the copper pillars except for one copper pillar which may be missing the porous copper in which:

DETAILED DESCRIPTION

The present inventors have determined that there is a need to preferentially remove solder from a single controlled collapse chip connection (C4) if the temporary chip attach process removes more than a certain amount of solder, for example 50% of the solder. Then a ball drop tool may be used to apply the correct volume of solder to the chip or to the laminate substrate on the proper final chip attach pad.

There is another need to remove solder from a laminate chip site as part of a multi-chip module laminate rework.

There is a further need to enable temporary testing of a location with solder but then to remove the solder prior to assembly.

There is yet another need to tailor the shape of a chip solder or laminate solder to optimize chip joining yields for mixed under bump metallurgy (UBM) assembly/bridge assembly.

Figure 1:
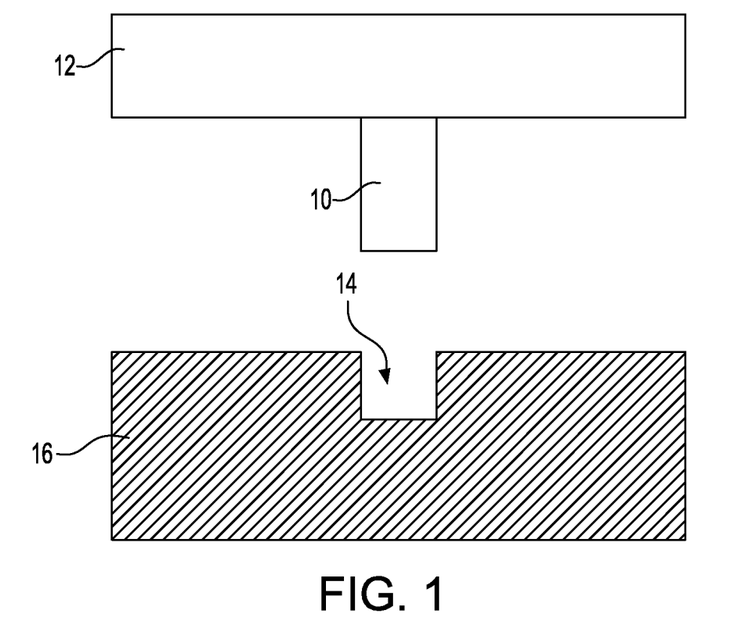
FIG. 1 illustrates a copper pillar joined to a first substrate and a cavity in a second substrate.

Referring to the Figures in more detail, and particularly referring to FIGS. 1 to 4, there is disclosed an exemplary embodiment of forming porous copper on the end of a copper pillar. In FIG. 1, a copper pillar 10 is joined to a first substrate 12. Separately, a cavity 14 is formed in a second substrate 16. The cavity 14 is sized to receive a quantity of a copper-containing paste as well as the copper pillar 10. The cavity 14 may have different depths and widths, or diameter in the case if the cavity is circular in cross section, for various volumes of solder removal.

While the first substrate and the second substrate may be made from a variety of materials, it is preferred that both of the first substrate and the second substrate be made with a similar CTE material. Thus, when the first substrate is a silicon die, the substrate would ideally be silicon which may be easily patterned or some type of nickel-iron or nickel-iron-cobalt alloy which may be tailored for a coefficient of thermal expansion (CTE) range from about 0.6 to 8.7/° C. In the case of a metal, the cavity will need to be coated with an organic material such as an epoxy material that is stable at temperatures above 250° C. or with a non-wetting metal such as Ti (titanium) or TiW (titanium tungsten).

Figure 2:
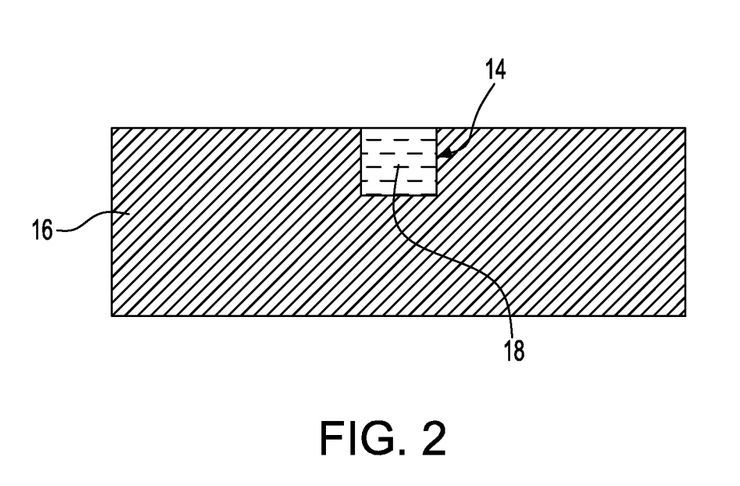
FIG. 2 illustrates a copper-containing paste filling the cavity in the second substrate.

In FIG. 2, a quantity of sinterable copper-containing paste 18 may be dispensed into the cavity 14. In one exemplary embodiment, the metal of the copper-containing paste may be 100 weight percent copper and the copper-containing paste may also include 5 to 10 weight percent of organics. Other formulations of the copper-containing paste are within the scope of the exemplary embodiments. Dispensing of the paste may be by means known to those skilled in the art. The cavity is sized to be a predetermined volume and the copper-containing paste 18 fills the cavity 14. For consistency, the copper-containing paste 18 fills the entire cavity 14 so there will always be a known quantity of copper-containing paste in the cavity 14.

Figure 3:
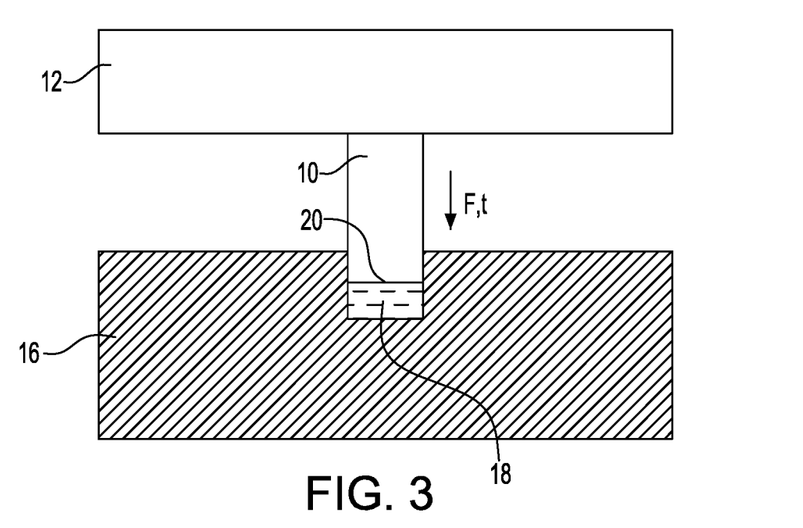
FIG. 3 illustrates the copper pillar pressed down against the copper-containing paste in FIG. 2 followed by a sintering process.

In FIG. 3, the first substrate 12 having the copper pillar 10 is positioned so that the copper pillar 10 is aligned with the cavity 14 having the copper-containing paste 18 and then a tip 20 of the copper pillar is pressed down against and into the copper-containing paste 18 with a predetermined force and for a predetermined time, as indicated by the nomenclature "F, t" in FIG. 3. The assembly of the first substrate 12 having the copper pillar 10 and the second substrate 16 may be heated to about 160 to 300° C., more preferably 160 to 200° C. for about 60 seconds. to sinter and densify the copper-containing paste into a porous copper. A nitrogen or formic atmosphere may be used during the sintering process. The force applied and the time in contact with the copper-containing paste 18 determines the thickness and porosity of the copper-containing paste. A higher force and longer time in contact will lead to less porosity in the sintered porous copper on the copper pillar 10.

Figure 4:
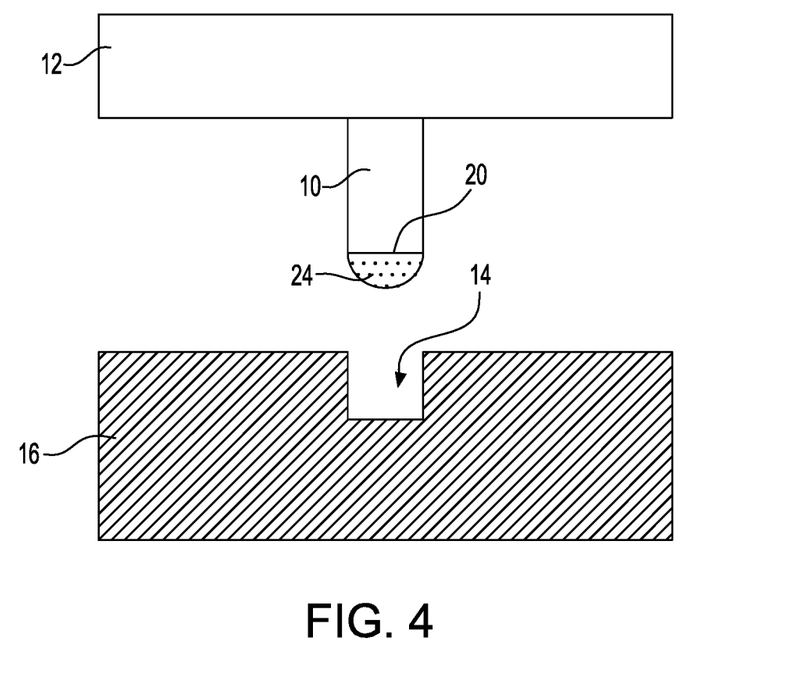
FIG. 4 illustrates the withdrawal of the copper pillar now having sintered porous copper on the tip of the copper pillar.

In FIG. 4, the first substrate 12 and copper pillar 10 are withdrawn from the cavity 14. The copper pillar 10 has the porous copper 24 on the tip 20 of the copper pillar 10. It is expected that no copper-containing paste 18 will remain in the cavity 14 as all or substantially all of the copper-containing paste 18 will be consumed during sintering.

In this exemplary embodiment, the present inventors have demonstrated how to create different thicknesses and porosities of the porous copper 24 on the tip 20 of the copper pillar 10 by varying the quantity of copper-containing paste 18 in the cavity 14, the force of the copper pillar 10 in contact with the copper-containing paste 18, and the time in contact, so that the copper pillar 10 with the porous copper 24 may be tailored for a given volume of solder removal.

Figure 5:
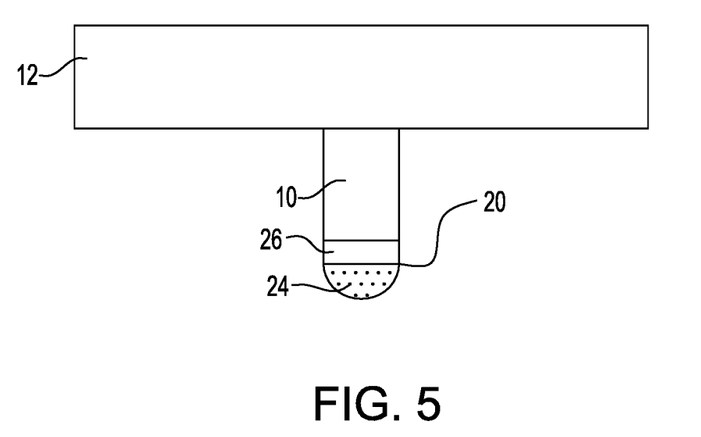
FIG. 5 illustrates an exemplary embodiment in which a nickel barrier is added to the tip of the copper pillar prior to forming the porous copper.

In one exemplary embodiment, a nickel barrier layer 26, for example two to five μm of nickel, may be formed on copper pillar 10 prior to contact with the copper-containing paste 18. FIG. 5 illustrates the first substrate 12 having the copper pillar 10, the nickel barrier layer 26 and the porous copper 24. The nickel barrier layer 26 may limit solder wicking up the sidewalls of the copper pillar 10.

Figure 6:
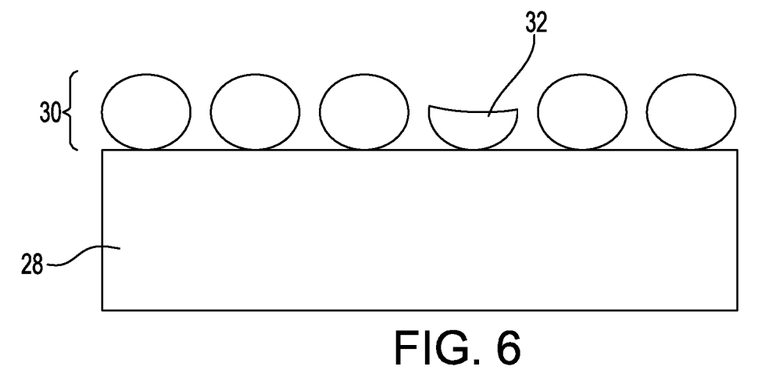
FIG. 6 illustrates the chip having a partially missing solder ball.

One exemplary embodiment is illustrated in FIGS. 6 to 10. FIG. 6 illustrates a semiconductor chip or just chip 28 that may have been previously attached to a test substrate (not shown) to test for functionality of the chip 28. Such a chip 28 may have solder ball connections 30, also known as C-4s, to connect the chip 28 to the temporary substrate for testing and then after testing, to connect the chip 28 to a final substrate. The chip 28 shown in FIG. 6 has the solder ball connections 30. One solder ball 32 of the solder ball connections 30 is not usable as part of the solder ball 32 is missing as a result of, for example, being previously attached to a test substrate.

Figure 7:
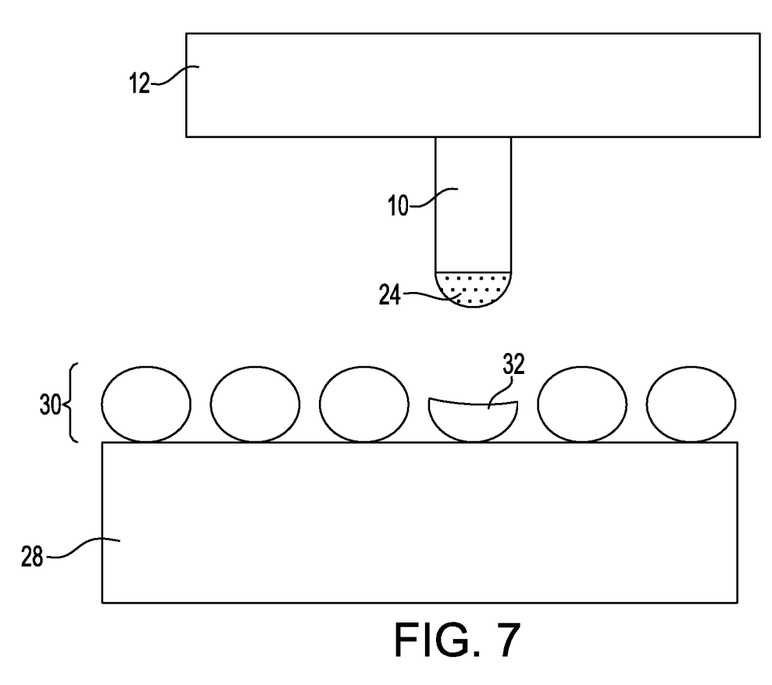
FIG. 7 illustrates the porous copper positioned over the partially missing solder ball.

Referring now to FIG. 7, the first substrate 12 having the copper pillar 10 and porous copper 24, as described previously, is positioned over the unusable solder ball 32.

Figure 8:
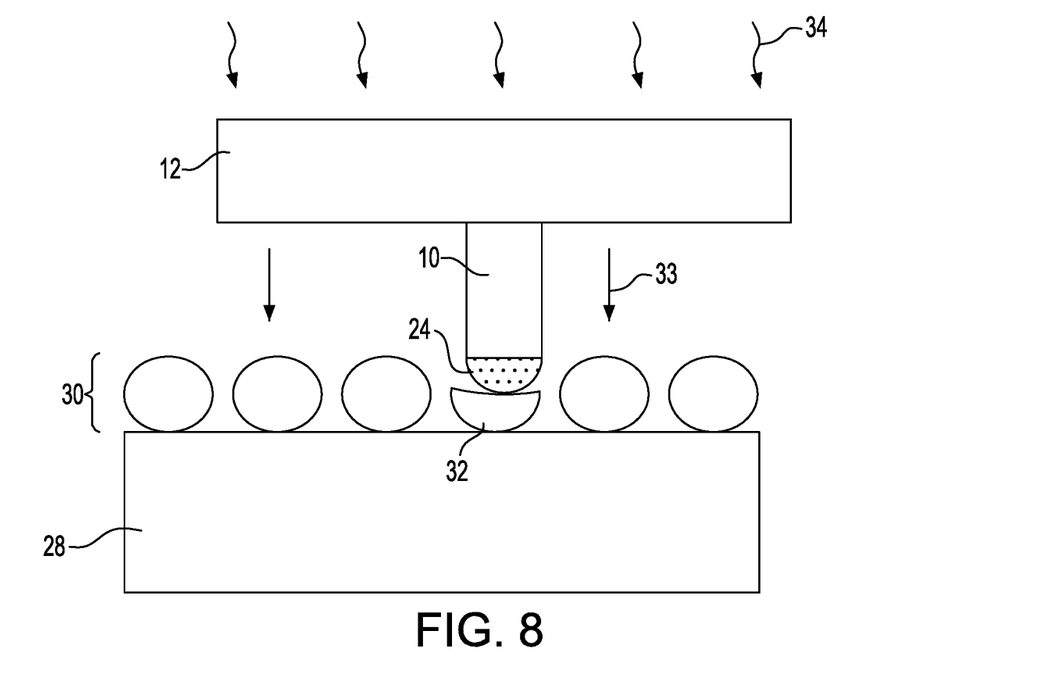
FIG. 8 illustrates the porous copper in contact with the partially missing solder ball and a heating step.

In FIG. 8, the first substrate 12 having the copper pillar 10 and porous copper 24 is moved downwardly, as indicated by arrows 33, to make contact with the unusable solder ball 32. The entire assembly shown in FIG. 8 is heated as indicated by arrows 34 to cause melting of the solder balls 30 and solder ball 32. The melted solder ball 32 joins with the porous copper 24.

The solder of the solder balls 30, 32 is heated to at least its solidus line and typically just above its liquidus, which may mean 230° C. All of the solder balls 30, 32 may go molten. A typical wafer and a typical laminate may each receive multiple reflows. On each reflow, the spacing of the solder balls 30, 32 are such that the solder balls 30, 32 do not touch when the solder is liquid. The surface tension of the defining pad and the total volume of solder at the location prevents the solder from wetting across the surface and making contact with an adjacent solder ball.

Figure 9:
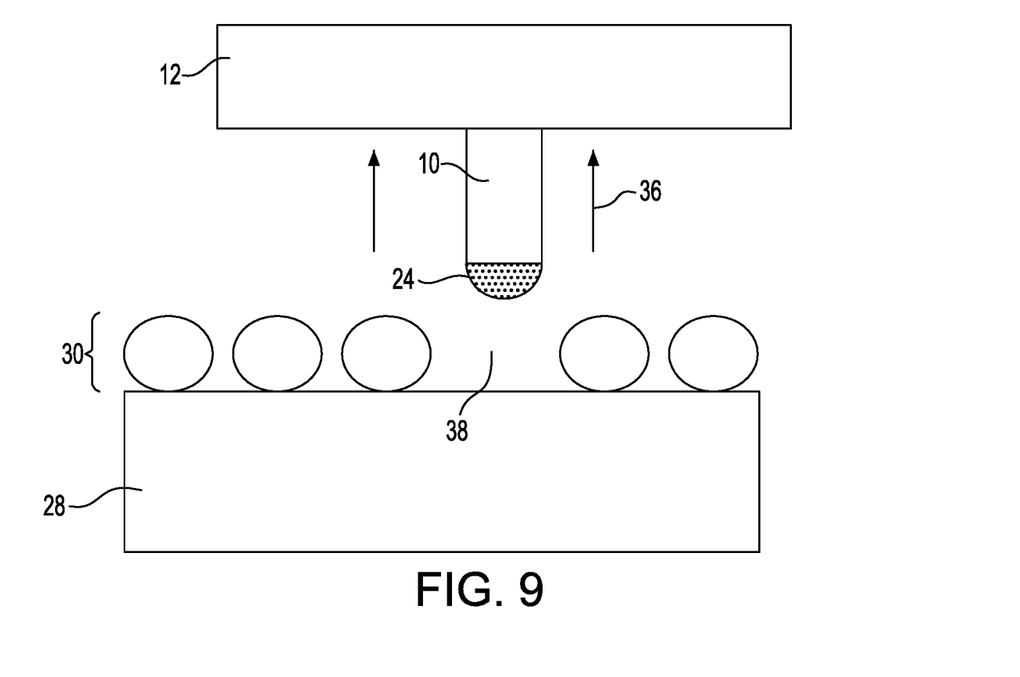
FIG. 9 illustrates the removal of the partially missing solder ball which is now joined with the porous copper.
Figure 10:
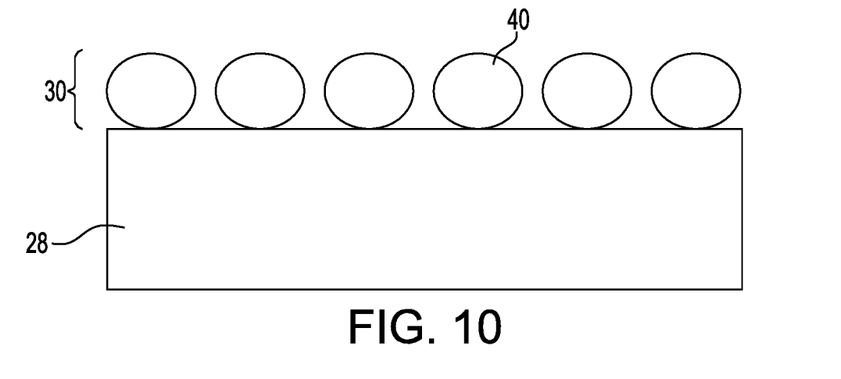
FIG. 10 illustrates the addition of a new solder ball in place of the removed partially missing solder ball.

In FIG. 9, the first substrate 12 having the copper pillar 10 and porous copper 24 with the solder from unusable solder ball 32 is moved away from the chip 28 as indicated by arrows 36. The chip site 38 formerly occupied by the unusable solder ball 32 is now ready for a new solder ball 40, as shown in FIG. 10. The new solder ball 40 may be added by a conventional ball drop tool. One or more reflows may take place after the addition of the new solder ball 40.

It should be understood that while FIGS. 6 to 10 illustrate the exemplary embodiment on a chip 28, the exemplary embodiment is equally applicable to a laminate substrate. The chip 28 is now repaired and ready for use.

It should be understood that while only one copper pillar 10 and only one corresponding cavity 14 are illustrated in FIGS. 1 to 10, there may be more than one copper pillar 10 and corresponding cavity 14 and the additional copper pillar 10 and corresponding cavity 14 need not be spaced at regular intervals but rather spaced to meet the demands of solder removal from a substrate.

The exemplary embodiments have particular applicability to present day solder connections which may be 5 um to 500 um in size and on a pitch of 10 um to 1000 um. In one particular application for C4 connections on the wafer/die, the solder balls may range in size from 40 um pitch (20 um diameter) to 200 um pitch (120 um diameter). For the laminate side, it is the same dimensions as on the die location but may contain less solder than the C4 connections. In another particular application for ball grid array (BGA) joints, the solder balls may range in size from 200 um pitch (120 um diameter) to 1000 um pitch (500 um diameter).

Figure 11:
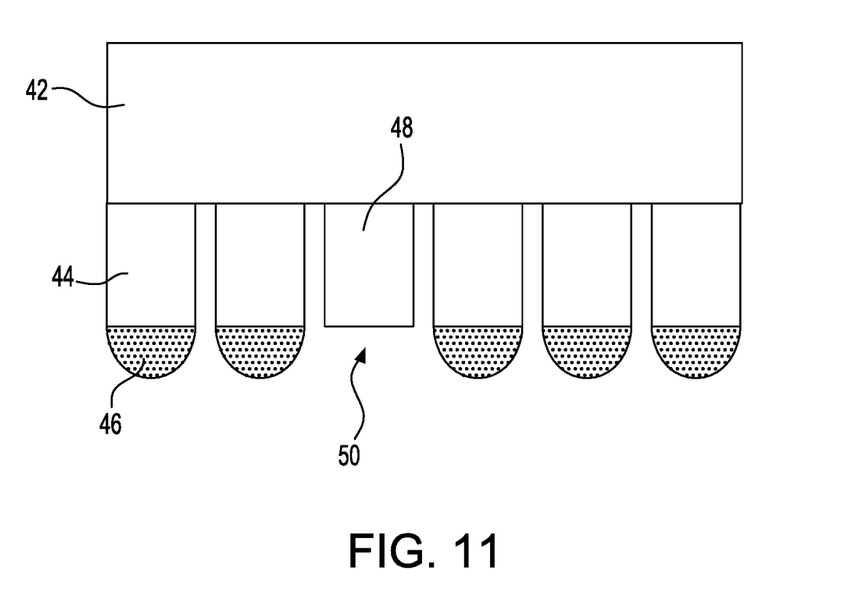
FIG. 11 illustrates the copper pillar without the porous copper.

Another exemplary embodiment is illustrated in FIGS. 11 to 16. In FIG. 11, there is illustrated a chip 42 having copper pillars 44. Each of the copper pillars 44 has porous copper 46 at the end of the copper pillar 44. However, one or more copper pillars, such as copper pillar 48, may be missing most or all of the porous copper that would normally be present, as indicated by arrow 50.

Figure 12:
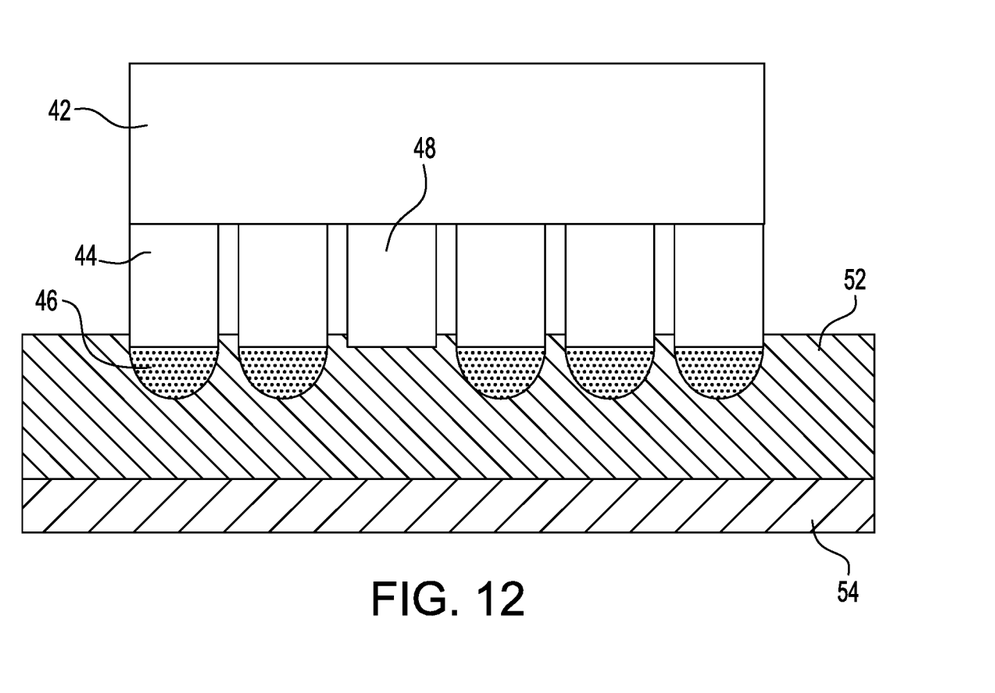
FIG. 12 illustrates all of the copper pillars being dipped into a copper-containing paste.

It may be necessary to repair the copper pillar 48 so that it has the porous copper, In this situation, as illustrated in FIG. 12, all of the copper pillars 44, 48, including those copper pillars having the porous copper 46, may be dipped into a copper-containing paste 52, as described previously, in container 54.

Figure 13:
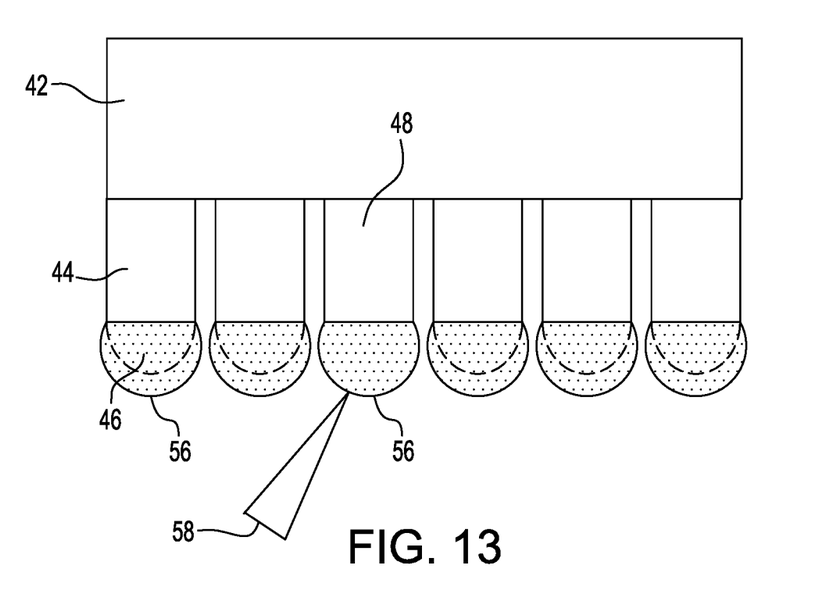
FIG. 13 illustrates the copper-containing paste on the copper pillar without the porous copper being heated by a laser to densify the copper-containing paste.

Referring now to FIG. 13, after removal of the copper pillars 44, 48 from the copper-containing paste 52, each of the copper pillars 44, 48 has a quantity 56 of copper-containing paste on the tips of the copper pillars 44, 48. Even those copper pillars 44 that have the porous copper 46 will also have the quantity 56 of copper-containing paste.

A laser 58 may be used to radiate the quantity 56 copper-containing paste 56 that is on copper pillar 48. The laser 58 provides a set amount of irradiance (Watts/mm$^2$) for a predetermined amount of time to input sufficient energy (Joules/mm$^2$) to sinter the copper-containing paste 56 into the porous copper. The amount of energy provided, and for how long, may be determined experimentally and should be sufficient to drive sintering of the copper-containing paste but not too much as to oxidize the copper.

Figure 16:
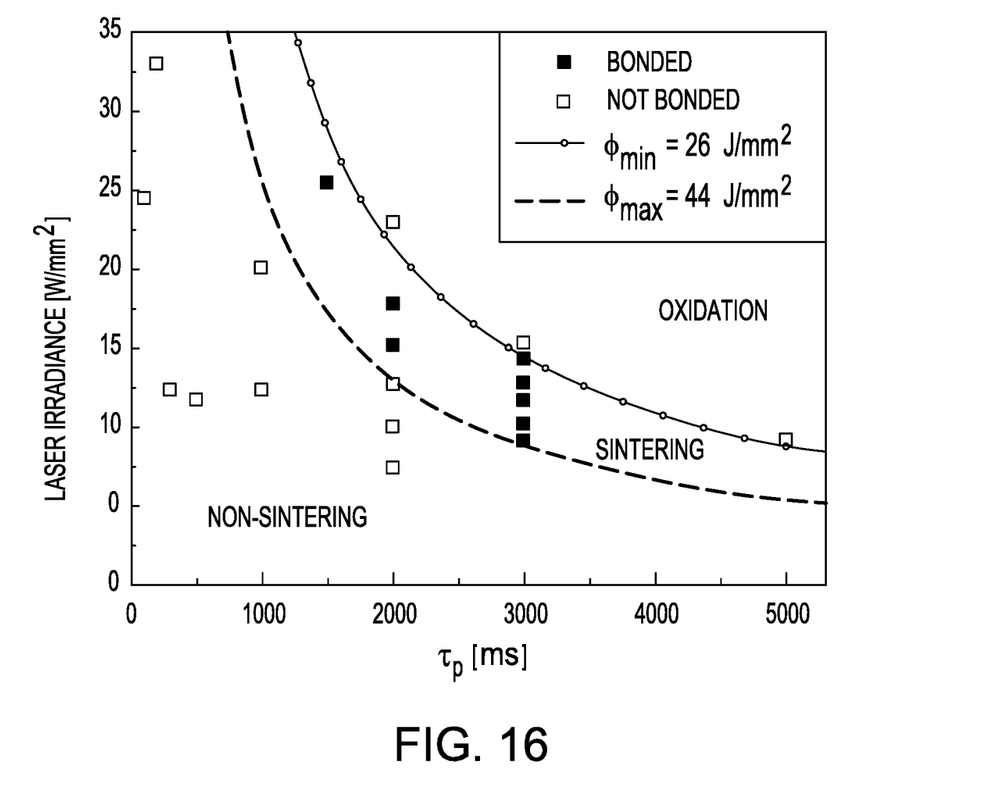
FIG. 16 illustrates a chart of laser irradiance versus time of laser irradiance.

For purposes of illustration and not limitation, the laser used may be a Nd:YAG laser. Referring to FIG. 16, there is shown an example of laser sintering and how the irradiance and predetermined amount of time may be adjusted to arrive at the desired sintering but not so much irradiance as to cause oxidation. In this example, the zone between the dashed lines and the dotted lines indicated sintering of the copper-containing paste into porous copper. This zone is a result of a proper choosing of irradiance and time to result in sintering. For less irradiance and shorter time, sintering would not occur while greater irradiance and greater time, undesirable oxidation of the cooper may occur. Generally speaking, higher irradiance for shorter time or less irradiance for longer times may result in the sintering of the copper-containing paste into porous copper without oxidation of the copper. Porosity of the porous copper may be controlled by adjusting the irradiance of the laser. In general, higher irradiance by the laser may result in lower porosity.

Figure 14:
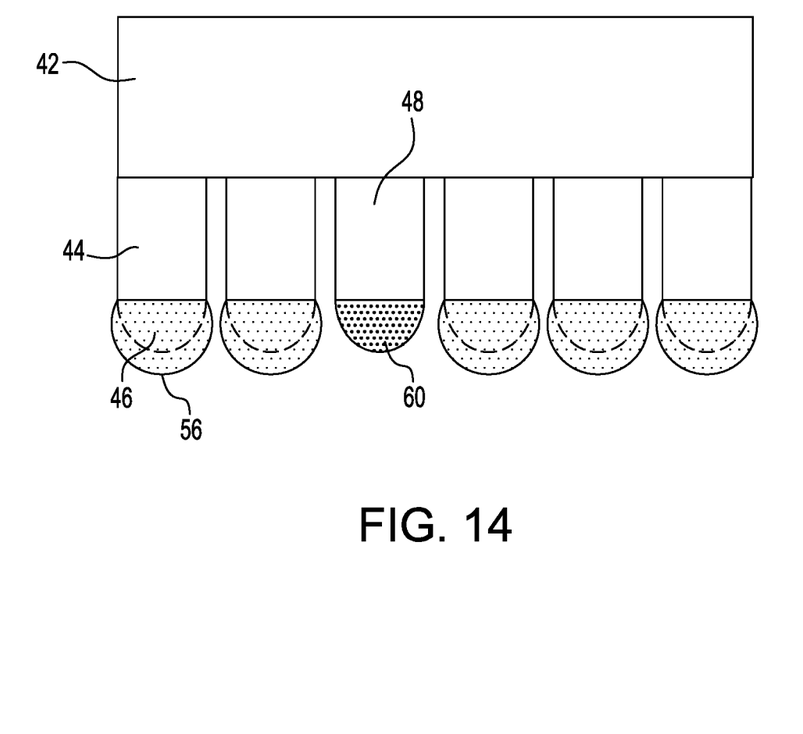
FIG. 14 illustrates the copper pillar now having porous copper after the laser sintering process in FIG. 13.

Referring now to FIG. 14, the chip 42 is shown after the laser sintering in FIG. 13. Copper pillar 48 now has porous copper 60 as a result of the laser sintering.

Figure 15:
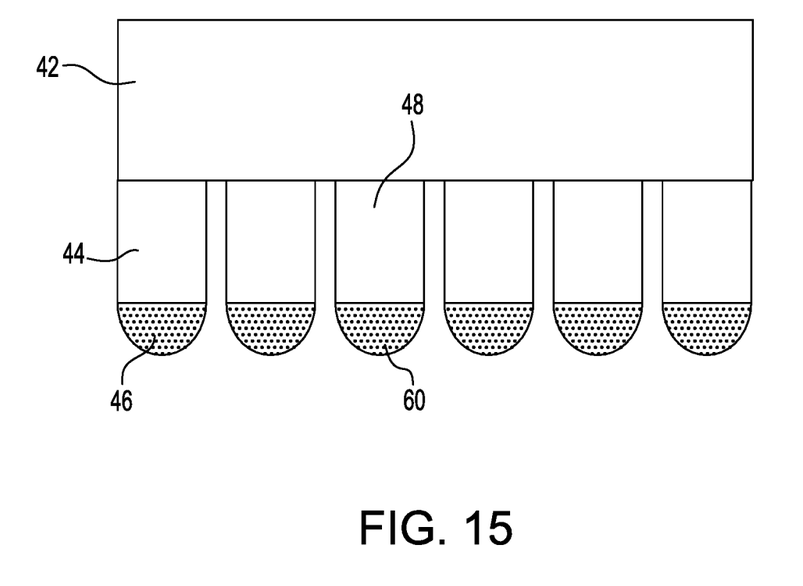
FIG. 15 illustrates the chip after the unsintered copper-containing paste is washed away.

After washing away the unsintered quantity 56 of copper-containing paste on each of copper pillars 44, the finished chip 42 is illustrated in FIG. 15 that now has copper pillars 44 having porous copper and copper pillar 48 having porous copper 60. The unsintered quantity 56 of copper-containing paste on each of the copper pillars 44 may be washed away with deionized water. Instead of, or included in the deionized water, the surfactant or solvent in the copper-containing paste may be used to wash away the unsintered quantity 56 of copper-containing paste.

Figure 17:
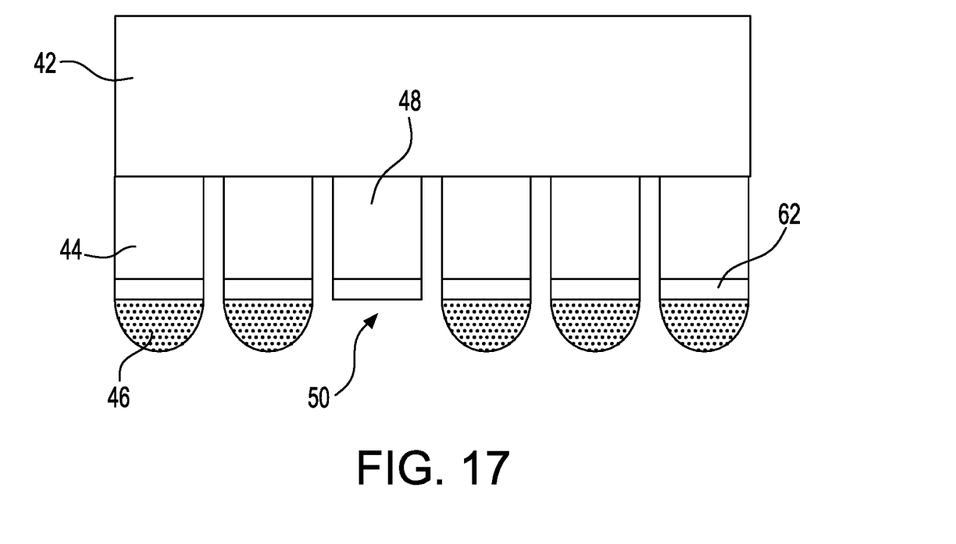
FIG. 17 illustrates an exemplary embodiment in which a nickel barrier is added to the tip of the copper pillar prior to forming the porous copper.

In an exemplary embodiment, each of the copper pillars 44, 48 may have a nickel barrier 62, as described previously, prior to formation of the porous copper 46, 60 as illustrated in FIG. 17. Other than the nickel barrier 62, the method proceeds as described previously with respect to FIGS. 11 to 16.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of forming a copper block for selective solder removal comprising the steps of:

joining a copper pillar to a first substrate;

creating a cavity in a second substrate;

adding a predetermined quantity of copper-containing paste into the cavity;

pressing an end of the copper pillar into the copper-containing paste in the cavity; and heating the copper pillar with the copper-containing paste in the cavity to a predetermined temperature to form a copper pillar having a predetermined volume of porous copper on the end of the copper pillar.

2. The method of claim 1 further comprising forming a nickel barrier on the end of the copper pillar prior to pressing the end of the copper pillar into the copper-containing paste in the cavity.

3. The method of claim 1 further comprising tailoring a volume of copper-containing paste, a force of the copper pillar in contact with the copper-containing paste and a time of the copper pillar in contact with the copper-containing paste to tailor a size and porosity of the porous copper.

4. The method of claim 3 wherein increasing the force of the copper pillar in contact with the copper-containing paste and increasing the time of the copper pillar in contact with the copper-containing paste results in decreasing porosity of the porous copper.

5. The method of claim 1 wherein the first substrate and the second substrate comprise silicon.

6. The method of claim 1 wherein the copper-containing paste comprises a metal which is 100 weight percent copper.

7. A method of selective solder removal comprising the steps of:
  joining a copper pillar to a first substrate;
  creating a cavity in a second substrate;
  adding a predetermined quantity of copper-containing paste into the cavity;
  pressing an end of the copper pillar into the copper-containing paste in the cavity;
  heating the copper pillar with the copper-containing paste in the cavity to a predetermined temperature to form a copper pillar having a predetermined volume of porous copper on the end of the copper pillar;
  applying the porous copper to a solder connection to be removed from a third substrate; and
  heating the porous copper and solder connection so as to cause melting of the solder connection and absorbing of the melted solder into the porous copper.

8. The method of claim 7 wherein the solder connection is a solder ball and the third substrate is a semiconductor device.

9. The method of claim 7 wherein the solder connection is a solder ball and the third substrate is a laminate substrate.

10. The method of claim 7 wherein in the step of applying, the solder connection to be removed is only from selected locations on the third substrate.

11. The method of claim 7 further comprising forming a nickel barrier on the end of the copper pillar prior to pressing the end of the copper pillar into the copper-containing paste in the cavity.

12. The method of claim 7 further comprising tailoring a volume of copper-containing paste, a force of the copper pillar in contact with the copper-containing paste and a time of the copper pillar in contact with the copper-containing paste to tailor a size and porosity of the porous copper.

13. The method of claim 7 wherein the first substrate and the second substrate comprise silicon.

14. The method of claim 7 wherein the copper-containing paste comprises a metal which is 100 weight percent copper.

\* \* \* \* \*